US009891986B2

(12) United States Patent
Sharma et al.

(10) Patent No.: US 9,891,986 B2
(45) Date of Patent: Feb. 13, 2018

(54) SYSTEM AND METHOD FOR PERFORMING BUS TRANSACTIONS (71) Applicant: FREESCALE SEMICONDUCTOR, INC., Austin, TX (US)

(72) Inventors: Nikhil Sharma, Shimla (IN); Rajesh Gupta, Noida (IN); Vivek Sharma, Dwarka (IN)

(73) Assignee: NXP USA, INC., Austin, TX (US)

( * ) Notice: Subject to any disclaimer, the term of this patent is extended or adjusted under 35 U.S.C. 154(b) by 94 days.

(21) Appl. No.: 15/006,130

(22) Filed: Jan. 26, 2016

(65) Prior Publication Data

US 2017/0212800 A1 Jul. 27, 2017

(51) Int. Cl.
*G06F 11/00* (2006.01)
*G06F 11/10* (2006.01)
*G06F 13/28* (2006.01)
*G06F 13/40* (2006.01)
*G06F 3/06* (2006.01)
*G06F 11/30* (2006.01)

(52) U.S. Cl.
CPC .......... *G06F 11/1016* (2013.01); *G06F 3/065* (2013.01); *G06F 3/068* (2013.01); *G06F 3/0619* (2013.01); *G06F 3/0644* (2013.01); *G06F 11/3027* (2013.01); *G06F 13/28* (2013.01); *G06F 13/404* (2013.01); *G06F 2201/81* (2013.01); *G06F 2201/87* (2013.01)

(58) Field of Classification Search
CPC .... G06F 11/1016; G06F 13/28; G06F 13/404; G06F 3/065; G06F 3/068; G06F 11/3027; G06F 3/0619; G06F 2201/87; G06F 2201/81

USPC .......................................................... 714/52
See application file for complete search history.

(56) References Cited

U.S. PATENT DOCUMENTS

| 6,526,537 B2 | 2/2003 | Kishino | |
|---|---|---|---|
| 6,532,511 B1 * | 3/2003 | Brooks | G06F 13/28 710/104 |
| 7,117,421 B1 | 10/2006 | Danilak | |
| 7,249,222 B1 * | 7/2007 | Bellis | G06F 12/0215 326/39 |
| 7,464,241 B2 * | 12/2008 | Vogt | G11C 5/04 711/111 |
| 7,899,957 B1 * | 3/2011 | Dhanoa | G06F 13/1673 710/22 |
| 8,443,122 B2 | 5/2013 | Yun et al. | |
| 2004/0024943 A1 * | 2/2004 | Lupien, Jr. | G06F 13/404 710/305 |

(Continued)

*Primary Examiner* — Yair Leibovich
(74) *Attorney, Agent, or Firm* — Charles E. Bergere (57) ABSTRACT

A system that performs a bus transaction includes a transaction controller and a protection code processing circuit. The transaction controller identifies a set of parameters corresponding to the bus transaction based on address and received control information, and modifies at least one parameter or splits the bus transaction into sub-transactions depending on the parameter values to map the bus transaction to a memory address space. The protection code processing circuit generates and inserts a protection code into data to be written to the memory, and removes a protection code from data read from the memory. The system facilitates error checking without requiring modification of the channels (e.g., bus width) used to read and/or write data to memory.

18 Claims, 6 Drawing Sheets

(56) References Cited

U.S. PATENT DOCUMENTS

| | | | |
|---|---|---|---|
| 2004/0044812 A1* | 3/2004 | Holm | G06F 13/4018 |
| | | | 710/110 |
| 2008/0034139 A1* | 2/2008 | Han | G06F 13/1605 |
| | | | 710/110 |
| 2012/0005559 A1 | 1/2012 | Jeong et al. | |
| 2012/0246369 A1* | 9/2012 | Takeuchi | G06F 11/3027 |
| | | | 710/110 |
| 2013/0117631 A1 | 5/2013 | Gruner et al. | |
| 2014/0214355 A1* | 7/2014 | Kawamura | G06F 11/221 |
| | | | 702/118 |
| 2015/0301890 A1 | 10/2015 | Marshall | |

* cited by examiner

SYSTEM AND METHOD FOR PERFORMING BUS TRANSACTIONS

BACKGROUND

The present invention relates generally to integrated circuits, and, more particularly, to a system for processing bus transactions.

Advancements in semiconductor technology have led to an increase in the processing speed of central processing units (i.e., processors). In order to perform a task, processors communicate with peripheral devices by way of busses to read data from peripheral devices memories and store (write) data in the peripheral devices memories. It is essential that such stored data be accurate. Thus, modern day IC include circuits that support error correction techniques.

A known error correction technique is to generate and store protection code for stored data. This technique requires partitioning a memory into two partitions—one for the data and one for the protection code. However, the data and the protection code are accessed using the same channel (i.e., system bus) and hence, two memory access cycles are required to access the data and the corresponding protection code, which increases bus transaction processing time.

A known technique to overcome this increase in bus transaction processing time is to include two separate sets of connections (one for each partition) to access data and corresponding protection code from the memory. Thus, the data and the protection code are accessed in parallel from the two partitions. Although this technique increases the bus transaction processing speed, it requires modification of the system bus, and hence, is not a transparent solution for processing bus transactions. Further, for applications that do not require data protection, the partition dedicated to storing the protection code is unused, resulting in inefficient utilization of the memory space and bus width.

It would be advantageous to have a system and method that processes a bus transaction without requiring memory partitioning and system bus modification.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system that performs a bus transaction is provided. The system includes a transaction controller and a protection code processing circuit. The transaction controller receives address and control information corresponding to the bus transaction and identifies a set of parameters corresponding to the bus transaction. The set of parameters includes at least one of a size, a burst length, and a type of the bus transaction. The transaction controller modifies at least one parameter and maps the bus transaction to a memory address space when the bus transaction is at least one of (i) an incrementing burst type transaction with a size equal to a first threshold value and a burst length less than or equal to a second threshold value, (ii) a fixed burst type transaction with a size equal to the first threshold value, (iii) a wrapping burst type transaction with a size equal to the first threshold value, and (iv) a transaction with a size less than the first threshold value. The protection code processing circuit receives data corresponding to the bus transaction when the bus transaction is a write transaction, generates and inserts a protection code in the data, and stores the modified data in the memory address space.

In another embodiment of the present invention, a method to perform a bus transaction is provided. The method comprises receiving address and control information corresponding to the bus transaction, and identifying a set of parameters corresponding to the bus transaction. The set of parameters includes at least one of a size, a burst length, and a type of the bus transaction. The method further comprises modifying at least one parameter for mapping the bus transaction to an address space of a memory when the bus transaction is at least one of (i) an incrementing burst type transaction with a size equal to a first threshold value and a burst length less than or equal to a second threshold value, (ii) a fixed burst type transaction with a size equal to the first threshold value, (iii) a wrapping burst type transaction with a size equal to the first threshold value, and (iv) a transaction with a size less than the first threshold value. The method further comprises receiving data when the bus transaction is a write transaction, generating and inserting a protection code in the data, and storing the modified data in the address space of the memory.

Various embodiments of the present invention provide a system for performing a bus transaction. The system includes a transaction controller and a protection code processing circuit. The transaction controller identifies a set of parameters corresponding to the bus transaction based on address and control information received and modifies at least one parameter or splits the bus transaction into sub-transactions depending on the parameter values to map the bus transaction to an address space of a memory. The protection code processing circuit generates and inserts a protection code in data that is to be written to the memory, and removes a protection code from data read from the memory.

The system handles the bus transaction to facilitate error correction without requiring modification of the channels using which the data is read from or written to the memory.

Figure 1:
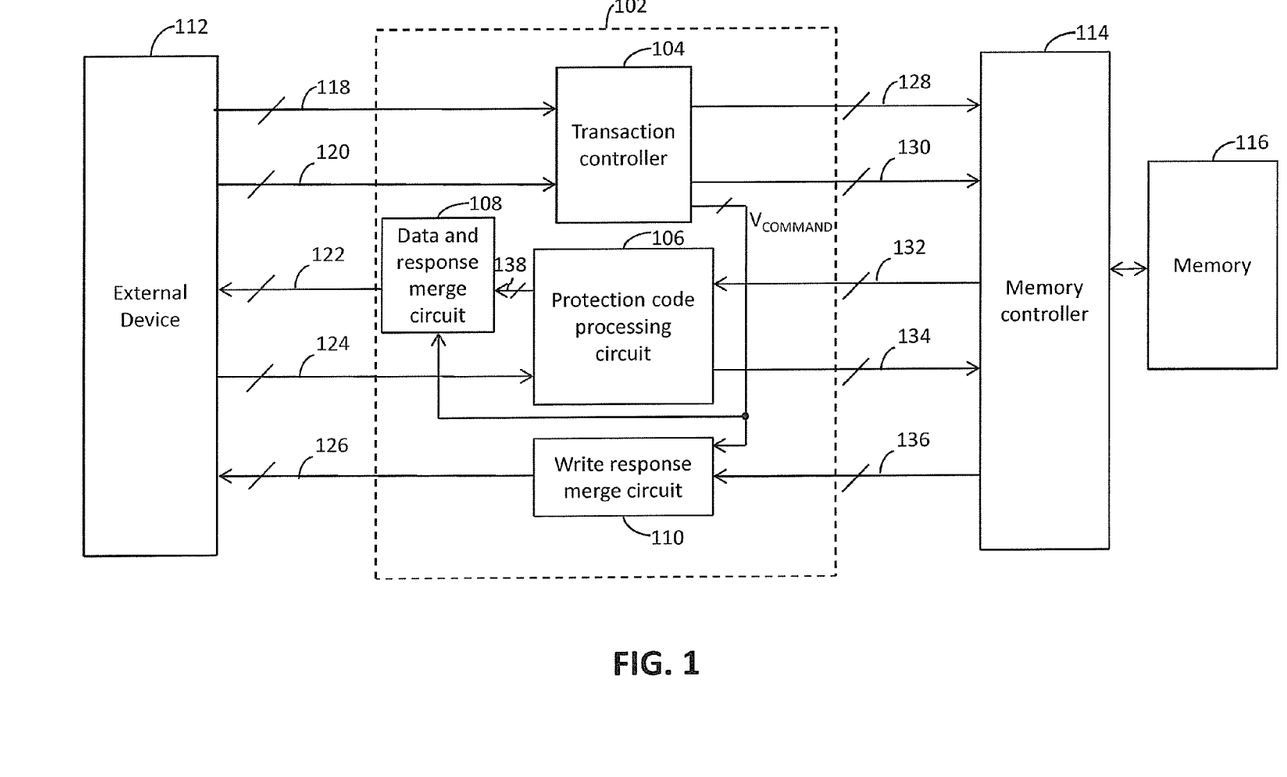
FIG. 1 is a schematic block diagram of a system that performs a bus transaction in accordance with an embodiment of the present invention.
Figure 2A:
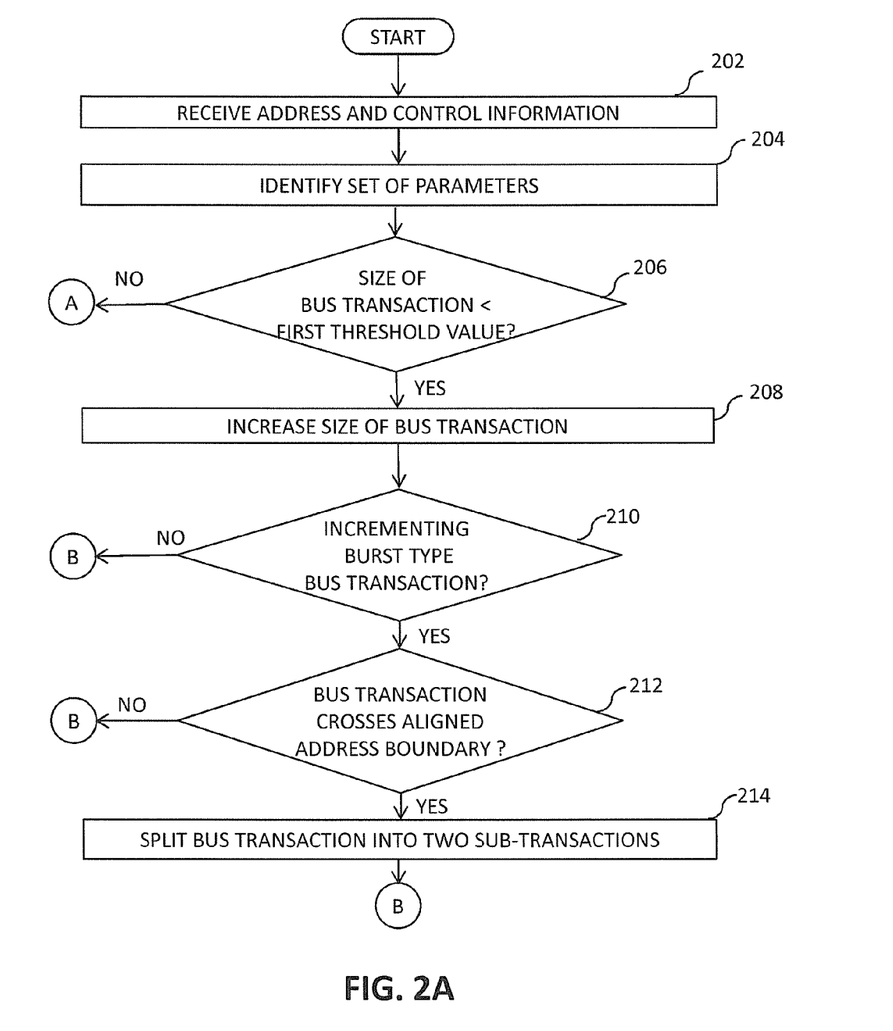
FIGS. 2A-2E are a flow chart illustrating a method for performing a bus transaction by the system of FIG. 1 in accordance with an embodiment of the present invention.
Figure 2B:
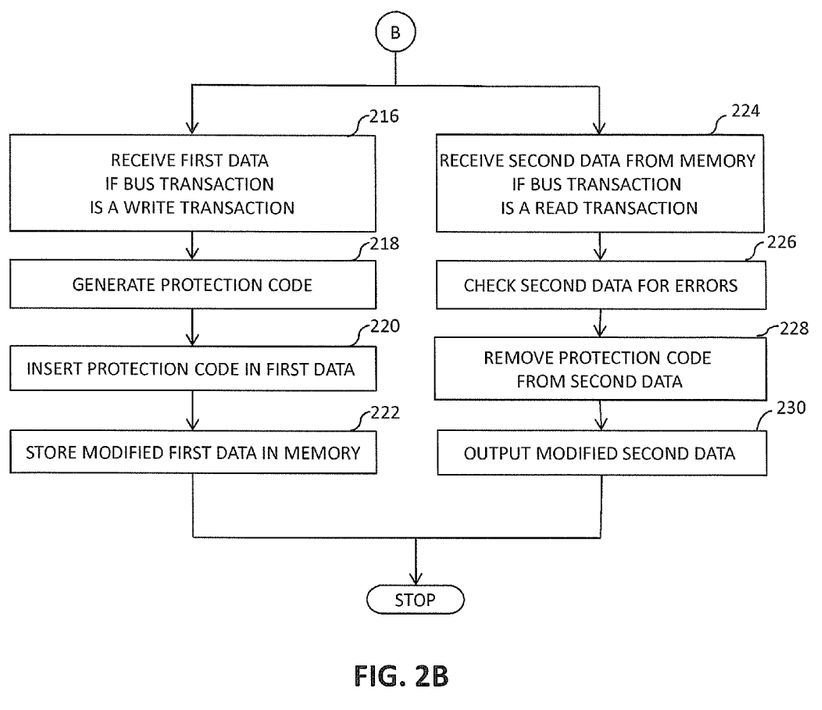
Figure 2C:
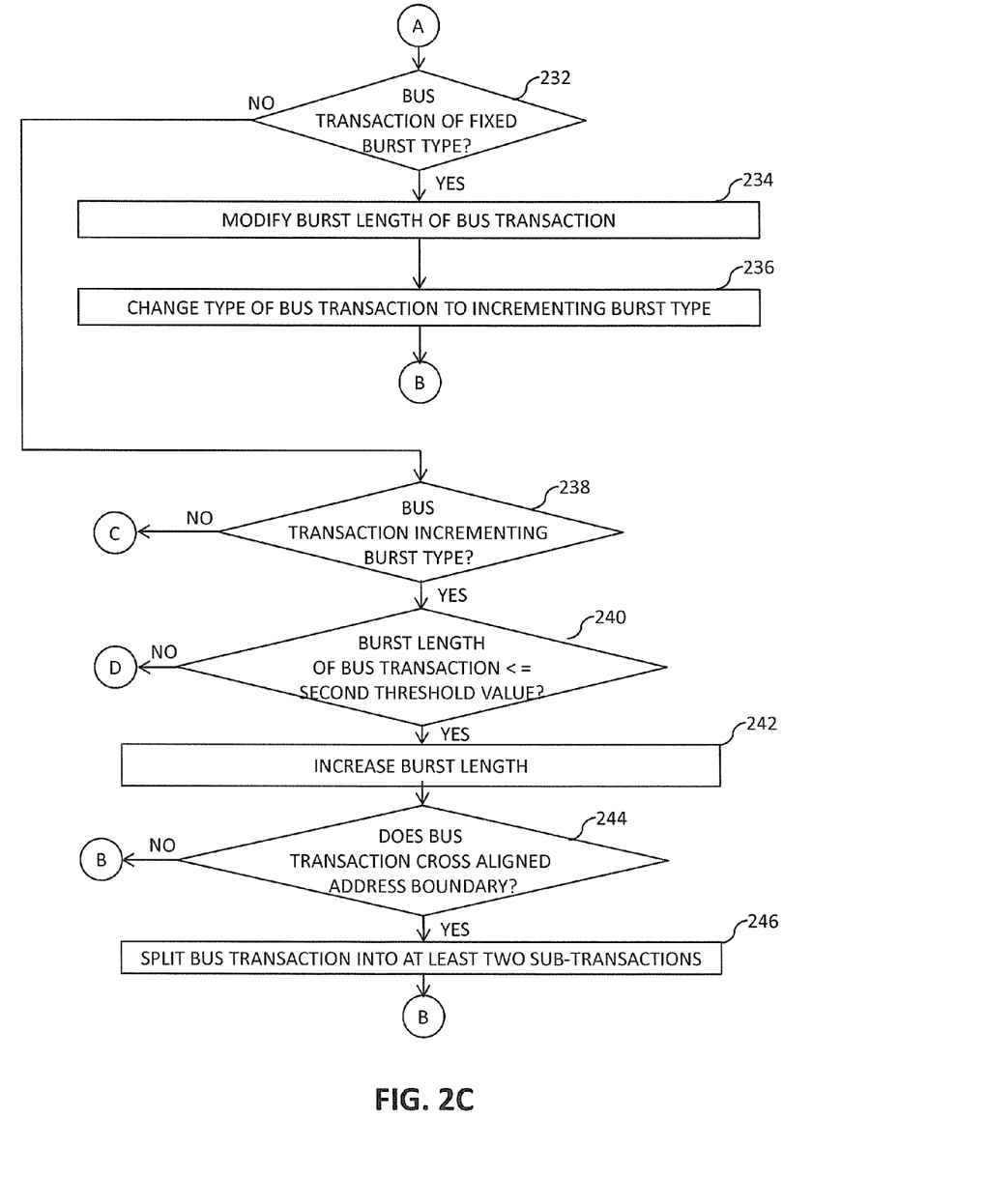
Figure 2D:
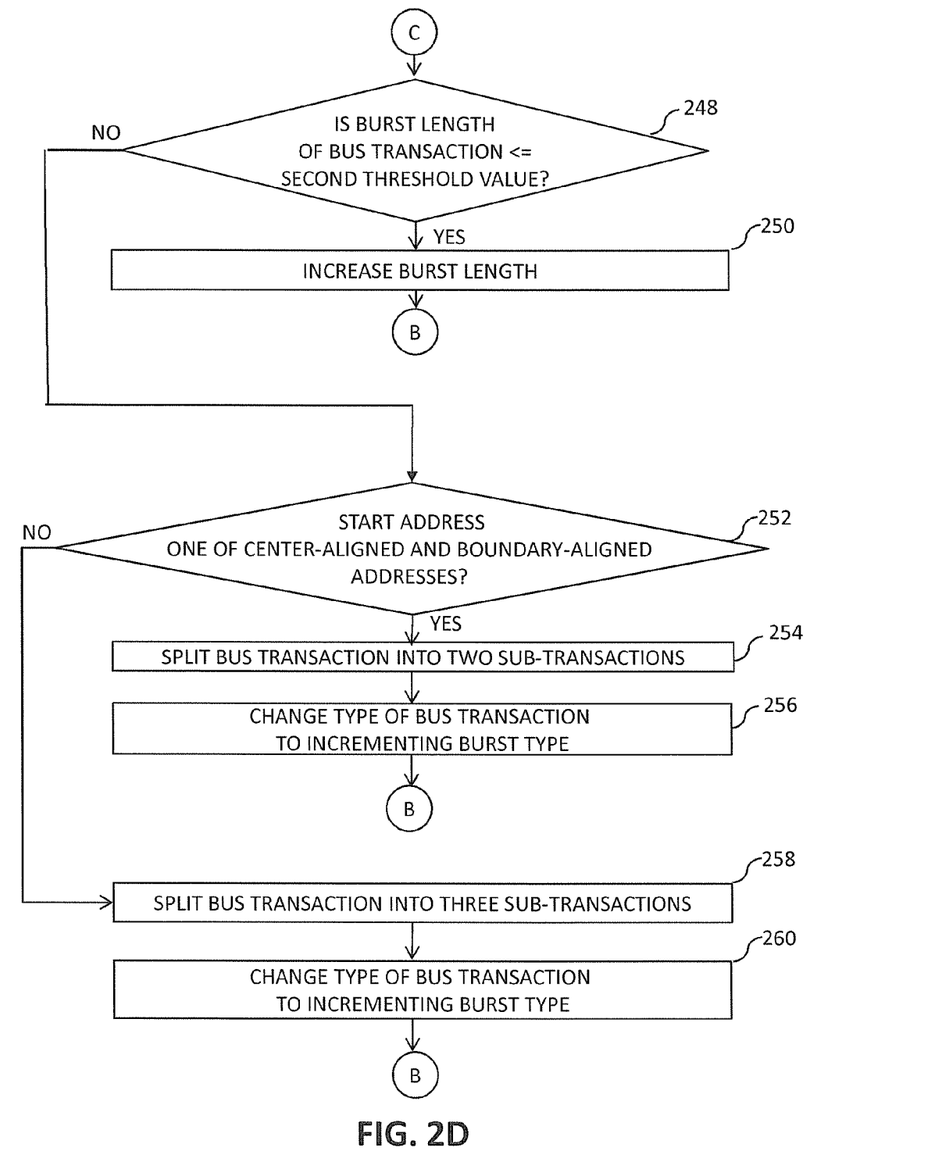
Figure 2E:
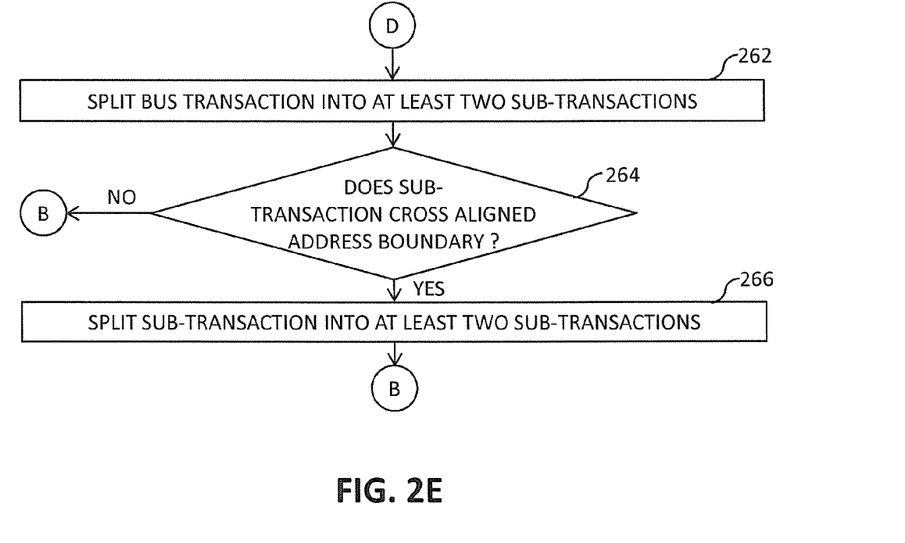

Referring now to FIG. 1, a system 102 that performs a bus transaction in accordance with an embodiment of the present invention is shown. The system 102 includes a transaction controller 104, a protection code processing circuit 106, a data and response merging circuit 108, and a write response merging circuit 110. The bus transaction can be a read transaction or a write transaction, and is requested by an external device 112. The system 102 modifies the bus transaction and provides the modified bus transaction to a memory controller 114 that is connected to a memory 116. In the presently preferred embodiment, the external device 112, the system 102, and the memory controller 114 communicate with each other using the Advanced eXtensible Interface (AXI) protocol 3.0 by way of first through tenth channels 118-136.

The external device 112 provides address and control information corresponding to the bus transaction to the transaction controller 104. If the bus transaction is a read transaction, the address and control information is provided to the transaction controller 104 by way of the first channel 118. If the bus transaction is a write transaction, the address and control information is provided to the transaction controller 104 by way of the second channel 120.

The transaction controller 104 determines the nature of burst transfers by identifying parameters of the bus transaction included in the address and control information. Since the data stored in the memory 116 includes protection code generated by the protection code processing circuit 106, the bus transaction needs to be modified to map the bus transaction to the address space of the memory 116, which is done by the transaction controller 104. Only a size, a type, and a burst length of the bus transaction are the parameters that are of interest to the transaction controller 104. All the other parameters in the control information are not altered. The number of locations in the memory 116 to which a byte of data received from the external device 112 is mapped depends on the size of the protection code inserted in the data. In one example, if one byte of protection code is inserted in the data received from the external device 112 for every byte of the data (i.e., when a ratio (R) of the protection code to the data is 1), the number of locations of the memory 116 to which the data is mapped is 2.

When the size of the bus transaction is less than a first threshold value (which corresponds to the maximum width of the third channel 122, which is equal to the maximum width of the fourth channel 124 in this embodiment) and is not an incrementing burst type transaction, the transaction controller 104 increases the size of the bus transaction. However, if the bus transaction is an incrementing burst type transaction with a size less than the first threshold value, the transaction controller 104 increases the size of the bus transaction and also splits the bus transaction into two sub-transactions if the bus transaction crosses an aligned address boundary. Aligned address boundaries are boundaries of virtual storages (partitions) into which the memory 116 is divided. The transaction controller 104 also calculates the start addresses and the burst lengths of the sub-transactions. The size of the bus transaction is doubled if the ratio (R) is 1.

When the size of the bus transaction is equal to the first threshold value and the bus transaction is a fixed burst type transaction, the transaction controller 104 modifies the burst length and changes the type of the bus transaction to the incrementing burst type. The burst length is modified to 2 if the ratio (R) is 1.

When the size of the bus transaction is equal to the first threshold value and the bus transaction is an incrementing burst type transaction, the transaction controller 104 compares the burst length of the bus transaction with a second threshold value. The second threshold value depends on the ratio (R) and the maximum number of beats that can be transferred in one bus transaction (which is 16 beats in this embodiment). The second threshold value is 8 beats if the ratio (R) is 1. If the burst length of the bus transaction is less than or equal to the second threshold value, the transaction controller 104 increases the burst length, which is doubled if the ratio (R) is 1. Further, if the bus transaction crosses an aligned address boundary, the transaction controller 104 splits the bus transaction into two sub-transactions, and calculates the start addresses and the burst length of the sub-transactions. However, if the burst length of the bus transaction is greater than the second threshold value, the transaction controller 104 splits the bus transaction into at least two sub-transactions. The number of sub-transactions into which the bus transaction is split depends on the ratio (R) and whether the bus transaction crosses an aligned address boundary.

In one example, the ratio (R) is 1 and the bus transaction is an incrementing burst type transaction with a burst length greater than the second threshold value and a size equal to the first threshold value. The transaction controller 104 splits the bus transaction into two sub-transactions with a burst length and a size that is the same as that of the bus transaction. The transaction controller 104 then splits a sub-transaction into two sub-transactions if the sub-transaction crosses an aligned address boundary. If a sub-transaction does not cross an aligned address boundary, the transaction controller 104 calculates the start addresses of each sub-transaction. Otherwise, the transaction controller 104 calculates the burst length along with the start address of each sub-transaction into which the sub-transaction that crosses the aligned address boundary is split.

When the size of the bus transaction is equal to the first threshold value and the bus transaction is a wrapping burst type transaction, the transaction controller 104 compares the burst length of the bus transaction with the second threshold value. If the burst length of the bus transaction is less than or equal to the second threshold value, the transaction controller 104 increases the burst length. The burst length is doubled if the ratio (R) is 1. However, if the burst length of the bus transaction is greater than the second threshold value, the transaction controller 104 splits the bus transaction into at least two sub-transactions and changes the type of the bus transaction to the incrementing burst type. The number of sub-transactions into which the bus transaction is split depends on the ratio (R) and whether the start address of the bus transaction is a center-aligned address, a boundary-aligned address, or neither of the two. The start address of the bus transaction is center-aligned if the start address is the center address (i.e., the mid-point of wrap boundaries) of the mapped section defined by the wrap boundaries in an input memory map that is visible to the external device 112. The start address is boundary-aligned if the start address is aligned with the first address (i.e., the start address) of the mapped section defined by the wrap boundaries in the input memory map.

In one embodiment, the ratio (R) is 1, and the bus transaction is a wrapping burst type transaction with a burst length greater than the second threshold value and a size equal to the first threshold value. If the start address of the bus transaction is a center-aligned address or a boundary-aligned address, the transaction controller 104 splits the bus transaction into two sub-transactions with a burst length and a size that is the same as that of the bus transaction, and changes the type of the bus transaction to the incrementing burst type. The transaction controller 104 also calculates the start addresses of each sub-transaction. However, if the start address is neither center-aligned nor boundary-aligned, the transaction controller 104 splits the bus transaction into three sub-transactions and changes the type of the bus transaction to the incrementing burst type. The transaction controller 104 also calculates the start address and the burst length of each of the three sub-transactions.

In another example, the ratio (R) is 1, the bus transaction is a wrapping burst type transaction, the size of the bus transaction is 64 bits (which is the first threshold value in this example), the burst length of the bus transaction is 16 beats, and the start address of the bus transaction included in the address and control information provided by the external device 112 is 0x20. Hence, the start address is neither center-aligned nor boundary-aligned. Thus, the transaction controller 104 splits the bus transaction into three sub-transactions—a first sub-transaction with a burst length of 4 beats and a start address as 0x20 and an end address as 0x3F, a second sub-transaction with a burst length of 8 beats and a start address as 0X40 and an end address as 0x7F, and a third sub-transaction with a burst length of 4 beats and a start address as 0X00 and an end address as 0x1F. After splitting the bus transaction into three sub-transactions, the transaction controller 104 calculates the start addresses of the three sub-transactions based on the address mapping scheme. Based on the ratio (R), the transaction controller 104 calculates the new burst length of the three sub-transactions for mapping the sub-transactions to the output memory map (i.e., the address space of the memory 116). Since the ratio (R) is 1, the modified burst length of the first sub-transaction is 8 beats, the modified burst length of the second sub-transaction is 16 beats, and the modified burst length of the third sub-transaction is 8 beats.

The transaction controller 104 provides address and control information, which includes a start address belonging to the mapped section of the memory 116, for the modified bus transaction to the memory controller 114 (by way of the sixth channel 128 if the bus transaction is a read transaction, and by way of the seventh channel 130 if the bus transaction is a write transaction). Based on the start address and the parameter values, the memory controller 114 calculates the subsequent addresses of the burst transfer. If the bus transaction is split into sub-transactions, the transaction controller 104 provides address and control information for each sub-transaction.

The protection code processing circuit 106 is connected between the external device 112 and the memory controller 114. When the bus transaction is a read transaction, the protection code processing circuit 106 receives the data (which includes the corresponding protection code) by way of the eighth channel 132 from the memory controller 114. The protection code processing circuit 106 removes the protection code from the data and provides the data to the data and response merging circuit 108 by way of an eleventh channel 138.

When the bus transaction is a write transaction, the protection code processing circuit 106 generates and inserts the protection code in the data that is received from the external device 112 by way of the fourth channel 124. After inserting the protection code in the data, the protection code processing circuit 106 provides the data to be stored in the mapped section of the memory 116 to the memory controller 114. The memory controller 114 then stores the data in the memory 116 based on the address and control information provided by the transaction controller 104. The protection code may be, but is not limited to, an error correction code (ECC), a parity checking code, and a cyclic redundancy check (CRC) code. In one embodiment, the protection code processing circuit 106 inserts bytes of the protection code in the data received from the external device 112 in an interleaved manner.

For a fixed burst type write transaction with a size equal to the first threshold value, the protection code processing circuit 106 drops all the beats of the data received from the external device 112 by way of the fourth channel 124, except for the last beat, and then inserts the generated protection code in the data. The data, along with the protection code that is to be written into the memory 116, is then transferred by the protection code processing circuit 106 to the memory controller 114 by way of the ninth channel 134.

The data and response merging circuit 108 includes buffers (not shown) to buffer the beats of data received from the protection code processing circuit 106. The data and response merging circuit 108 is also connected to the transaction controller 104 to receive a command signal ($V_{COMMAND}$) and merges the beats of the bus transaction only if the size of the bus transaction is equal to the first threshold value. The merging of the beats is done based on the ratio (R) indicated by the command signal ($V_{COMMAND}$). The data and response merging circuit 108 then transfers the merged beats to the external device 112 by way of the third channel 122. The data and response merging circuit 108 also merges read responses of the beats, received from the memory controller 114 by way of the protection code processing circuit 106, into one read response based on the ratio (R) indicated by the command signal ($V_{COMMAND}$) and the priority of the read responses received, and provides the merged read response to the external device 112 by way of the third channel 122. In the presently preferred embodiment, a DECERR read response has the highest priority, followed by SLVERR, OKAY, and EXOKAY read responses in that order.

In one example, the bus transaction is a read transaction with a size equal to the first threshold value, and the ratio (R) is 1. Thus, the data and response merging circuit 108 merges two beats into one and two read responses into one. If the two read responses received are OKAY and EXOKAY, then the merged response sent to the external device 112 is the OKAY read response, since the OKAY read response has a higher priority as compared to the EXOKAY read response.

For a fixed burst type read transaction with a size equal to the first threshold value, the data and response merging circuit 108 replicates the data and read responses a number of times equal to the burst length of the bus transaction received from the external device 112. The data and response merging circuit 108 provides the replicated data along with the replicated read responses to the external device 112 by way of the third channel 122.

The write response merging circuit 110 is connected between the memory controller 114 and the external device 112. It is also connected to the transaction controller 104 to receive the command signal ($V_{COMMAND}$). For a write transaction, the write response merging circuit 110 receives write responses for each sub-transaction from the memory controller 114 by way of the tenth channel 136. The write response merging circuit 110 merges the write responses into one write response based on the number of sub-transactions into which the bus transaction is split (which is indicated by the command signal ($V_{COMMAND}$)) and the priority of the write responses received, and provides the combined write response to the external device 112 by way of the fifth channel 126. In one embodiment, the write response merging circuit 110 includes buffers (not shown) to buffer the write responses received from the memory controller 114. In the presently preferred embodiment, a DECERR write response has the highest priority, followed by SLVERR, OKAY, and EXOKAY write responses in that order.

In one example, if the bus transaction is a write transaction and is split into two sub-transactions. If the two write responses received are SLVERR and EXOKAY write responses, then the merged response that is sent to the external device 112 is the SLVERR write response, since the SLVERR write response has a higher priority as compared to the EXOKAY write response.

In one embodiment, the memory 116 includes a dedicated section for data with protection code embedded in the data. Thus, after receiving the address and control information from the external device 112, the transaction controller 104 checks whether the bus transaction is protection enabled, based on the address and control information. If the transaction controller 104 determines that the bus transaction is protection enabled, only then the transaction controller 104 maps the bus transaction to the address space of the memory 116 based on the parameter values.

In one embodiment, an error detection circuit (not shown) may be included between the protection code processing circuit 106 and the memory controller 114. The error detection circuit checks whether the data read from the memory 116 includes errors, based on the protection code included in the data. If the data includes errors, the data may be corrected by using error correction techniques such as the Hamming Code, and then the data is provided to the external device 112. Further, an interrupt may be sent to the external device 112 to indicate the presence of errors in the data.

Thus, to map a bus transaction to the address space of the memory 116, the transaction controller 104 modifies at least one parameter of the bus transaction when the bus transaction is at least one of (i) a bus transaction with a size less than the first threshold value, (ii) an incrementing burst type transaction with a size equal to the first threshold value and a burst length less or equal to the second threshold value, (iii) a fixed burst type transaction with a size equal to the first threshold value, and (iv) a wrapping burst type transaction with a size equal to the first threshold value. If the bus transaction is an incrementing burst type transaction with a burst length greater than the second threshold value, the transaction controller 104 splits the bus transaction into at least two sub-transactions.

The transaction controller 104 handles the bus transactions to facilitate error correction such that no modification of the channels including the first through tenth channels 118-136 is required, thereby providing a transparent solution.

It will be understood by those with skill in the art that the ratio (R) can be any ratio depending on the application, and is not restricted to 1.

Referring now to FIGS. 2A-2E, a flow chart illustrating a method for performing a bus transaction in accordance with an embodiment of the present invention is shown. At step 202, the transaction controller 104 receives the address and control information corresponding to the bus transaction from the external device 112. At step 204, the transaction controller 104 identifies the set of parameters corresponding to the bus transaction. At step 206, if the transaction controller 104 determines that the size of the bus transaction is less than the first threshold value, the transaction controller 104 executes step 208. At step 208, the transaction controller 104 increases the size of the bus transaction. At step 210, if the transaction controller 104 determines that the bus transaction is of the incrementing burst type, the transaction controller 104 executes step 212. At step 212, if the transaction controller 104 determines that the bus transaction crosses an aligned address boundary, the transaction controller 104 executes step 214. At step 214, the transaction controller 104 splits the bus transaction into two sub-transactions and then executes steps 216-222 if the bus transaction is a write transaction and steps 224-230 if the bus transaction is a read transaction. At step 216, the protection code processing circuit 106 receives first data. At step 218, the protection code processing circuit 106 generates the protection code for the first data. At step 220, the protection code processing circuit 106 inserts the protection code in the first data. At step 222, the protection code processing circuit 106 stores the modified first data in the address space of the memory 116. At step 224, the protection code processing circuit 106 receives second data from the memory 116 by way of the memory controller 114. At step 226, the error detection circuit checks the second data to detect errors in the second data based on the protection code. The error detection circuit may correct the errors in the second data or provide an interrupt to the external device 112, indicating the presence of errors in the requested data. At step 228, the protection code processing circuit 106 removes the protection code from the second data. At step 230, the protection code processing circuit 106 outputs the modified second data to the external device 112. At step 206, if the transaction controller 104 determines that the size of the bus transaction is equal to the first threshold value, the transaction controller 104 executes step 232. At step 232, if the transaction controller 104 determines that the bus transaction is of the fixed burst type, the transaction controller 104 executes step 234. At step 234, the transaction controller 104 modifies the burst length of the bus transaction. At step 236, the transaction controller 104 changes the type of the bus transaction to the incrementing burst type and then executes at least one of steps 216-222 and 224-230. At step 232, if the transaction controller 104 determines that the bus transaction is not of the fixed burst type, the transaction controller 104 executes step 238. At step 238, if the transaction controller 104 determines that the bus transaction is of the incrementing burst type, the transaction controller 104 executes step 240. At step 240, if the transaction controller 104 determines that the burst length of the bus transaction is less than or equal to the second threshold value, the transaction controller 104 executes step 242. At step 242, the transaction controller 104 increases the burst length of the bus transaction. At step 244, if the transaction controller 104 determines that the bus transaction crosses an aligned address boundary, the transaction controller 104 executes step 246. At step 246, the transaction controller 104 splits the bus transaction into two sub-transactions and then executes at least one of steps 216-222 and 224-230. At step 238, if the transaction controller 104 determines that the bus transaction is not of the incrementing burst type, the transaction controller 104 executes step 248. At step 248, if the transaction controller 104 determines that the burst length of the bus transaction is less than or equal to the second threshold value, the transaction controller 104 executes step 250. At step 250, the transaction controller 104 increases the burst length of the bus transaction and then executes at least one of steps 216-222 and 224-230. At step 248, if the transaction controller 104 determines that the burst length of the bus transaction is greater than the second threshold value, the transaction controller 104 executes step 252. At step 252, if the transaction controller 104 determines that the start address of the bus transaction is center-aligned or boundary-aligned, the transaction controller 104 executes step 254. At step 254, the transaction controller 104 splits the bus transaction into two sub-transactions. At step 256, the transaction controller 104 changes the type of the bus transaction to the incrementing burst type and then executes at least one of steps 216-222 and 224-230. At step 252, if the transaction controller 104 determines that the start address of the bus transaction is neither center-aligned nor boundary-aligned, the transaction controller 104 executes step 258. At step 258, the transaction controller 104 splits the bus transaction into three sub-transactions. At step 260, the transaction controller 104 changes the type of the bus transaction to the incrementing burst type and then executes at least one of steps 216-222 and 224-230. At step 240, if the transaction controller 104 determines that the burst length of the bus transaction is greater than the second threshold value, the transaction controller executes step 262. At step 262, the transaction controller 104 splits the bus transaction into at least two sub-transactions. At step 264, if the transaction controller 104 determines that each of the sub-transactions crosses an aligned address boundary, the transaction controller 104 executes step 266. At step 266, the transaction controller 104 splits the sub-transaction into two sub-transactions and then executes at least one of steps 216-222 and 224-230. At step 264, if the transaction controller 104 determines that the sub-transactions do not cross an aligned address boundary, the transaction controller 104 executes at least one of steps 216-222 and 224-230. At step 244, if the transaction controller 104 determines that the bus transaction does not cross an aligned address boundary, the transaction controller 104 executes at least one of steps 216-222 and 224-230. At step 210, if the transaction controller 104 determines that the bus transaction is not of the incrementing burst type, the transaction controller 104 executes at least one of steps 216-222 and 224-230. At step 212, if the transaction controller 104 determines that the bus transaction does not cross the aligned address boundary, the transaction controller 104 executes at least one of steps 216-222 and 224-230.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for performing a bus transaction, the system comprising:
    a transaction controller that (i) receives address and control information corresponding to the bus transaction, (ii) identifies a set of parameters corresponding to the bus transaction, and (iii) modifies at least one parameter of the set of parameters for mapping the bus transaction to an address space of a memory when the bus transaction is at least one of a bus transaction that is of an incrementing burst type with a size equal to a first threshold value and a burst length less than or equal to a second threshold value, a bus transaction that is of a fixed burst type with a size equal to the first threshold value, a bus transaction that is of a wrapping burst type with a size equal to the first threshold value, and a bus transaction with a size less than the first threshold value, wherein the set of parameters includes at least one of a size of the bus transaction, a type of the bus transaction, and a burst length of the bus transaction;
    a protection code processing circuit that receives first data corresponding to the bus transaction when the bus transaction is a write transaction, and generates and inserts a first protection code in the first data, wherein the modified first data is stored in the address space of the memory; and
    a write response merging circuit that merges write responses received from a memory controller of the memory into a single write response and outputs the single write response when the bus transaction is a write transaction, and the transaction controller splits the bus transaction into sub-transactions, wherein the memory controller provides a write response for each sub-transaction.

2. The system of claim 1, wherein the protection code processing circuit receives second data corresponding to the bus transaction from the memory when the bus transaction is a read transaction, removes a second protection code from the second data, and outputs the modified second data.

3. The system of claim 2, further comprises a data and response merging circuit that merges beats of the modified second data into a single beat before outputting the modified second data, merges read responses received from a memory controller of the memory into a single read response, and outputs the single read response, wherein the memory controller provides a read response for each beat of the modified second data.

4. The system of claim 1, wherein the transaction controller increases the size of the bus transaction when the size of the bus transaction is less than the first threshold value.

5. The system of claim 1, wherein when the size of the bus transaction is equal to the first threshold value and the bus transaction is of the fixed burst type, the transaction controller modifies the burst length of the bus transaction and changes the type of the bus transaction to the incrementing burst type.

6. The system of claim 1, wherein when the bus transaction is of the incrementing burst type and the bus transaction crosses an aligned address boundary, the transaction controller splits the bus transaction into at least two sub-transactions.

7. The system of claim 1, wherein:
    when the bus transaction is of the incrementing burst type, the size of the bus transaction is equal to the first threshold value, and the burst length of the bus transaction is less than or equal to the second threshold value, the transaction controller increases the burst length of the bus transaction, and
    when the bus transaction is of the incrementing burst type, the size of the bus transaction is equal to the first threshold value, and the burst length of the bus transaction is greater than the second threshold value, the transaction controller splits the bus transaction into at least two sub-transactions.

8. The system of claim 1, wherein when the bus transaction is of the wrapping burst type, the size of the bus transaction is equal to the first threshold value, and the burst length of the bus transaction is less than or equal to the second threshold value, the transaction controller increases the burst length of the bus transaction.

9. The system of claim 1, wherein when the bus transaction is of the wrapping burst type, the size of the bus transaction is equal to the first threshold value, the burst length of the bus transaction is greater than the second threshold value, and a start address of the bus transaction is at least one of center-aligned and boundary-aligned addresses, the transaction controller splits the bus transaction into at least two sub-transactions and changes the type of the bus transaction to the incrementing burst type, and wherein the address information includes the start address of the bus transaction.

10. The system of claim 1, wherein when the bus transaction is of the wrapping burst type, the size of the bus transaction is equal to the first threshold value, the burst length of the bus transaction is greater than the second threshold value, and a start address of the bus transaction is neither a center-aligned address nor a boundary-aligned address, the transaction controller splits the bus transaction into at least three sub-transactions and changes the type of the bus transaction to the incrementing burst type, and wherein the address information includes the start address of the bus transaction.

11. A computer-implemented method for performing a bus transaction, the method comprising:
   receiving address and control information corresponding to the bus transaction;
   identifying a set of parameters corresponding to the bus transaction, wherein the set of parameters includes at least one of a size of the bus transaction, a type of the bus transaction, and a burst length of the bus transaction;
   modifying at least one parameter of the set of parameters for mapping the bus transaction to an address space of a memory when the bus transaction is at least one of a bus transaction that is of an incrementing burst type with a size equal to a first threshold value and a burst length less than or equal to a second threshold value, a bus transaction that is of a fixed burst type with a size equal to the first threshold value, a bus transaction that is of a wrapping burst type with a size equal to the first threshold value, and a bus transaction with a size less than the first threshold value;
   receiving first data corresponding to the bus transaction when the bus transaction is a write transaction;
   generating and inserting a first protection code in the first data;
   storing the modified first data in the address space of the memory; and
   wherein when the bus transaction is a write transaction and when the bus transaction is split into sub-transactions, the method further comprises:
      receiving write responses corresponding to the sub-transactions;
      merging the write responses into a single write response; and
      outputting the single write response.

12. The method of claim 11, further comprising:
   receiving second data corresponding to the bus transaction from the memory when the bus transaction is a read transaction;
   removing a second protection code from the second data; and
   outputting the modified second data.

13. The method of claim 12, further comprising:
   merging beats of the modified second data into a single beat before outputting the modified second data;
   merging read responses corresponding to the beats of the modified second data into a single read response; and
   outputting the single read response.

14. The method of claim 11, wherein modifying the at least one parameter comprises increasing the size of the bus transaction when the size of the bus transaction is less than the first threshold value.

15. The method of claim 11, wherein when the size of the bus transaction is equal to the first threshold value and the bus transaction is of the fixed burst type, modifying the at least one parameter further comprises:
   modifying the burst length of the bus transaction; and
   changing the type of the bus transaction to the incrementing burst type.

16. The method of claim 11, wherein modifying the at least one parameter further comprises splitting the bus transaction into at least two sub-transactions when the bus transaction is the incrementing burst type and the bus transaction crosses an aligned address boundary.

17. The method of claim 11, wherein modifying the at least one parameter further comprises:
   increasing the burst length of the bus transaction when the bus transaction is the incrementing burst type, the size of the bus transaction is equal to the first threshold value, and the burst length of the bus transaction is less than or equal to the second threshold value; and
   splitting the bus transaction into at least two sub-transactions when the bus transaction is the incrementing burst type, the size of the bus transaction is equal to the first threshold value, and the burst length of the bus transaction is greater than the second threshold value.

18. The method of claim 11, wherein:
   when the bus transaction is the wrapping burst type, the size of the bus transaction is equal to the first threshold value, and the burst length of the bus transaction is less than or equal to the second threshold value, then modifying the at least one parameter further comprises increasing the burst length of the bus transaction;
   when the bus transaction is the wrapping burst type, the size of the bus transaction is equal to the first threshold value, the burst length of the bus transaction is greater than the second threshold value, and a start address of the bus transaction is at least one of center-aligned and boundary-aligned addresses, wherein the address information includes the start address of the bus transaction, then modifying the at least one parameter further comprises:
   splitting the bus transaction into at least two sub-transactions; and
   changing the type of the bus transaction to the incrementing burst type; and
   when the bus transaction is the wrapping burst type, the size of the bus transaction is equal to the first threshold value, the burst length of the bus transaction is greater than the second threshold value, and the start address of the bus transaction is neither a center-aligned address nor a boundary-aligned address, then modifying the at least one parameter further comprises:
   splitting the bus transaction into at least three sub-transactions; and
   changing the type of the bus transaction to the incrementing burst type.

* * * * *